United States Patent
Lin et al.

(10) Patent No.: US 10,525,922 B1
(45) Date of Patent: Jan. 7, 2020

(54) LOWER LEG AIRBAG ASSEMBLY FOR A VEHICLE

(71) Applicant: GM Global Technology Operations LLC, Detroit, MI (US)

(72) Inventors: Chin-Hsu Lin, Troy, MI (US); Yi-Pen Cheng, Troy, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/057,132

(22) Filed: Aug. 7, 2018

(51) Int. Cl.
| | |
|---|---|
| *B60R 21/0132* | (2006.01) |
| *B60R 21/20* | (2011.01) |
| *B60R 21/2338* | (2011.01) |
| *B60R 21/231* | (2011.01) |
| *B60R 21/26* | (2011.01) |
| *B60R 21/015* | (2006.01) |
| *B60R 21/16* | (2006.01) |
| *B60R 21/233* | (2006.01) |
| *B60R 21/01* | (2006.01) |

(52) U.S. Cl.
CPC .... *B60R 21/0132* (2013.01); *B60R 21/01516* (2014.10); *B60R 21/01538* (2014.10); *B60R 21/20* (2013.01); *B60R 21/2338* (2013.01); *B60R 21/23184* (2013.01); *B60R 21/26* (2013.01); *B60R 2021/01286* (2013.01); *B60R 2021/161* (2013.01); *B60R 2021/23308* (2013.01); *B60R 2021/23386* (2013.01); *B60R 2021/23388* (2013.01)

(58) Field of Classification Search
CPC ... B60R 21/231; B60R 21/20; B60R 21/0132; B60R 21/2338; B60R 21/01516; B60R 21/01538; B60R 21/23184; B60R 21/26
See application file for complete search history.

(56) References Cited

U.S. PATENT DOCUMENTS

| | | | | |
|---|---|---|---|---|
| 5,161,820 | A * | 11/1992 | Vollmer | B60R 21/01524 180/273 |
| 6,158,766 | A | 12/2000 | Kowalski | |
| 6,371,511 | B1 * | 4/2002 | Kitagawa | B60R 21/02 280/730.1 |
| 6,962,368 | B2 * | 11/2005 | Hjerpe | B60N 3/06 280/751 |
| 7,055,893 | B2 * | 6/2006 | Yamamura | B60N 3/066 296/187.08 |
| 7,246,837 | B2 * | 7/2007 | Dendo | B60N 3/066 24/289 |
| 10,266,140 | B2 * | 4/2019 | El-Jawahri | B60R 21/0136 |

(Continued)

FOREIGN PATENT DOCUMENTS

| | | |
|---|---|---|
| KR | 19980052465 U | 10/1998 |
| KR | 100993032 B1 | 11/2010 |

*Primary Examiner* — Faye M Fleming
(74) *Attorney, Agent, or Firm* — Quinn IP Law

(57) ABSTRACT

An airbag assembly including an airbag configured to be coupled to a vehicle floor of a vehicle. The airbag is movable between a stowed position and a deployed position. In the stowed position, the airbag is deflated. In the deployed position, the airbag is inflated and spaced apart from the vehicle floor to define an aperture between the airbag and the vehicle floor. The aperture is sized to receive feet or lower leg of a vehicle occupant, thereby limiting movement of the legs of the vehicle occupant when an external force is exerted on the vehicle.

20 Claims, 7 Drawing Sheets

(56) References Cited

U.S. PATENT DOCUMENTS

| | | | |
|---|---|---|---|
| 10,343,642 B2 * | 7/2019 | Faruque | B60R 21/232 |
| 2016/0016527 A1 * | 1/2016 | Aselage | B60R 21/0132 |
| | | | 280/728.3 |
| 2019/0161045 A1 * | 5/2019 | Thomas | B60R 21/21 |

* cited by examiner

LOWER LEG AIRBAG ASSEMBLY FOR A VEHICLE

INTRODUCTION

The present disclosure generally relates to an airbag and, more specifically, to a lower leg airbag for a vehicle.

Vehicles include airbags configured to deploy. Upon deployment, the airbag prevents a passenger's lower legs from contacting a rigid structure or other occupants within the vehicle.

SUMMARY

The present disclosure describes a vehicle system including an airbag assembly for protecting a lower region of the legs of one or more vehicle occupants. The vehicle system may be a driver-operated vehicle, a shared autonomous vehicle (SAV) or an autonomous vehicle (AV). In SAVs and AVs, the seating arrangement may allow the vehicle occupants to face each other. In other words, the vehicle seats of the vehicle system allows the vehicle occupants to face each other. Such seating arrangement is sometimes called a campfire seating configuration. In such seating arrangement, the legs of the vehicle occupant may swing upwards when the vehicle system is subjected to an external force. It is desirable to minimize the swinging motion of the legs to protect the lower region of the legs of the vehicle occupant. To this end, the present disclosure describes an airbag assembly configured to limit the movement of the legs (especially the lower region) of the vehicle occupant when the vehicle system is subjected to the external force. Specifically, the presently disclosed airbag assembly prevents hyperextension of the knee of the vehicle occupant when the vehicle system is subjected to the external force.

The present disclosure describes an airbag assembly including an airbag configured to be coupled to a vehicle floor of a vehicle. The airbag is movable between a stowed position and a deployed position. In the stowed position, the airbag is deflated. In the deployed position, the airbag is inflated and spaced apart from the vehicle floor to define an aperture between the airbag and the vehicle floor. The aperture is sized to receive feet of a vehicle occupant, thereby limiting movement of the legs of the vehicle occupant when an external force is exerted on the vehicle. The airbag defines a first airbag end and a second airbag end opposite the first airbag end. The first airbag end is directly coupled to the vehicle floor. The second airbag end is directly coupled to the vehicle floor. The first airbag end is spaced apart from the second airbag end to define the aperture upon deployment of the airbag. The airbag assembly may further at least one tether interconnecting the airbag and the vehicle floor to control a height of the airbag upon deployment. The airbag may have a circular tubular shape in the deployed position. The airbag may have a rectangular shape in the deployed position. The airbag may have a triangular shape in the deployed position. The airbag may extend along an entire width of the vehicle floor in the deployed position.

The airbag may include a first tube, a second tube, and a chamber disposed between the first tube and the second tube. The first tube and the second tube may be obliquely angled relative to each other in the deployed position. The chamber may be adjacent the vehicle floor and directly interconnects the first tube and the second tube such that, upon deployment of the airbag, the first tube and the second tube move away from each other. The chamber may alternatively be spaced apart from the vehicle floor and directly interconnects the first tube and the second tube such that, upon deployment of the airbag, the first tube and the second tube move away from each other. The airbag may be substantially shaped as a pyramidal frustum and has a height sufficient to limit movement of knees of the vehicle occupant upon deployment of the airbag.

The airbag assembly may further include an inflator coupled to the airbag such that the inflator is configured to inflate the airbag, a controller in electronic communication with the inflator, a tether-length adjustment mechanism in electronic communication with the controller, an airbag-position adjustment mechanism in electronic communication with the controller, and a camera in electronic communication with the controller, an accelerometer in electronic communication with the controller, and a pressure sensor coupled to a vehicle seat and in electronic communication with the controller. The pressure sensor is configured to detect whether the vehicle seat is occupied by the vehicle occupant. The tether-length adjustment mechanism is configured to adjust a length of the at least one tether. The camera system is configured to locate a position of the legs of the vehicle occupant and measure a length of the legs. The airbag-position adjustment mechanism is configured to adjust a position of the airbag relative to the vehicle floor. The controller is programmed to: detect, via the controller, that the vehicle occupant is seated on the vehicle seat based a pressure signal received from the pressure sensor; determine, via the controller, a location the legs of the vehicle occupant relative to the vehicle floor based on an image data from the camera system in response to determining that the vehicle occupant is seated on the vehicle seat; determine, via the controller, the length of the legs of the vehicle occupant based on the image data from the camera system in response to determining that the vehicle occupant is seated on the vehicle seat; command, via the controller, the airbag-position adjustment mechanism to adjust the position of the airbag relative to vehicle floor based on the location of the legs of the vehicle occupant; and command, via the controller, the tether-length adjustment mechanism to adjust the height of the airbag relative to the vehicle floor based on the length of the legs of the vehicle occupant. Further, the controller is programmed to: determine whether the vehicle has been subjected to the external force based on an acceleration signal from the accelerometer; and in response to determining that the vehicle has been subjected to the external force, command the inflator to inflate the airbag. The the controller is further programmed to: determine whether the vehicle has not been subjected to the external force based on an acceleration signal from the accelerometer, and in response to determining that the vehicle has not been subjected to the external force, determine again the location of the legs of the vehicle occupant relative to the vehicle floor based on the image data from the camera system.

The present disclosure also describes a method for controlling the operation of the airbag assembly. The method includes the following steps: (a) detecting, via the controller, that the vehicle occupant is seated on the vehicle seat based a pressure signal received from the pressure sensor; (b) determining, via the controller, a location the legs of the vehicle occupant relative to the vehicle floor based on an image data from the camera in response to determining that the vehicle occupant is seated on the vehicle seat; (c) determining, via the controller, the length of the legs of the vehicle occupant based on the image data from the camera in response to determining that the vehicle occupant is seated on the vehicle seat; (d) commanding, via the controller, the airbag-position adjustment mechanism to adjust the position of the airbag relative to vehicle floor based on the location of the legs of the vehicle occupant; and (e) commanding, via the controller, the tether-length adjustment mechanism to adjust the height of the airbag relative to the vehicle floor based on the length of the legs of the vehicle occupant.

The method may further include determining, via the controller, whether the vehicle has been subjected to an external force based on an acceleration signal from the accelerometer; and in response to determining that the vehicle has been subjected to the external force, commanding, via the controller, the inflator to inflate the airbag. The method may further include determining, via the controller, whether the vehicle has been subjected to an external force based on an acceleration signal from the accelerometer, and in response to determining that the vehicle has not been subjected to the external force, determining again, via the controller, the location the legs of the vehicle occupant relative to the vehicle floor based on the image data from the camera.

The present disclosure also describes a vehicle including a vehicle body, a vehicle floor coupled to the vehicle body. The vehicle body and the vehicle floor collectively define a passenger compartment. The vehicle system further includes an airbag assembly as described above.

The above features and advantages and other features and advantages of the present disclosure are readily apparent from the following detailed description of the best modes for carrying out the disclosure when taken in connection with the accompanying drawings.

DETAILED DESCRIPTION

Figure 1:
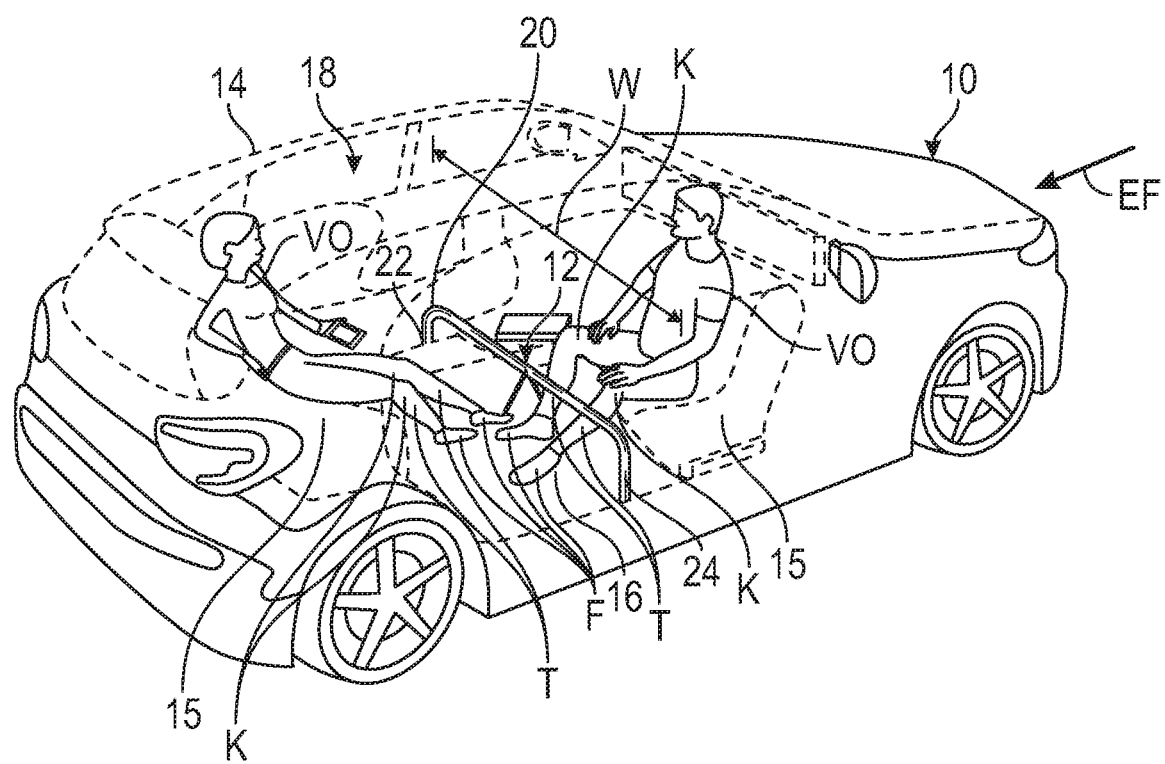
FIG. 1 is a schematic perspective view of a vehicle including an airbag assembly in accordance with the present disclosure.

With reference to FIG. 1, the present disclosure describes a vehicle 10 including an airbag assembly 12 for protecting a lower region (i.e., tibia T, knees K, and feet F) of the legs L of one or more vehicle occupants VO. The vehicle 10 may be a shared autonomous vehicle (SAV) or an autonomous vehicle (AV). In SAVs and AVs, the seating arrangement may allow the vehicle occupants to face each other. In other words, the vehicle seats 15 of the vehicle 10 allow the vehicle occupant to face each other. Such seating arrangement is sometimes called a campfire seating configuration. In such seating arrangement, the legs L of the vehicle occupant VO may swing upwards when the vehicle 10 is subjected to an external force EF. It is desirable to minimize the swinging motion of the legs L to protect the lower region (e.g., tibia T, knees K, feet F, and ankles A) of the vehicle occupant VO. To this end, the present disclosure describes an airbag assembly 12 configured to limit the movement of the legs L (especially the lower region) of the vehicle occupant VO when the vehicle 10 is subjected to the external force EF. Specifically, the presently disclosed airbag assembly 12 prevents hyperextension of the knee K of the vehicle occupant VO when the vehicle 10 is subjected to the external force EF.

With continued reference to FIG. 1, the vehicle 10 includes a vehicle body 14 and a vehicle floor 16 coupled to the vehicle body 14. The vehicle body 14 and the vehicle floor 16 collectively define a passenger compartment 18 of the vehicle 10. The airbag assembly 12 includes an airbag 20 coupled to the vehicle floor 16. In the depicted embodiment, the airbag 20 is directly coupled to the vehicle floor 16 to facilitate protecting the lower region of the legs L of the vehicle occupant VO when the external force EF is exerted on the vehicle body 14.

Figure 2:
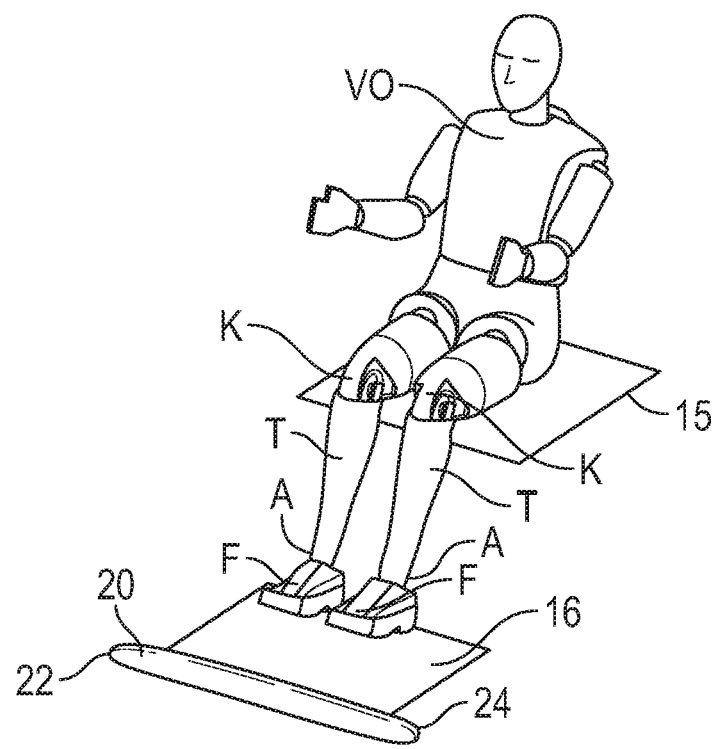
FIG. 2 is a schematic perspective view of a vehicle seat and the airbag assembly of FIG. 1, wherein the airbag assembly includes an airbag depicted in the stowed position.
Figure 3:
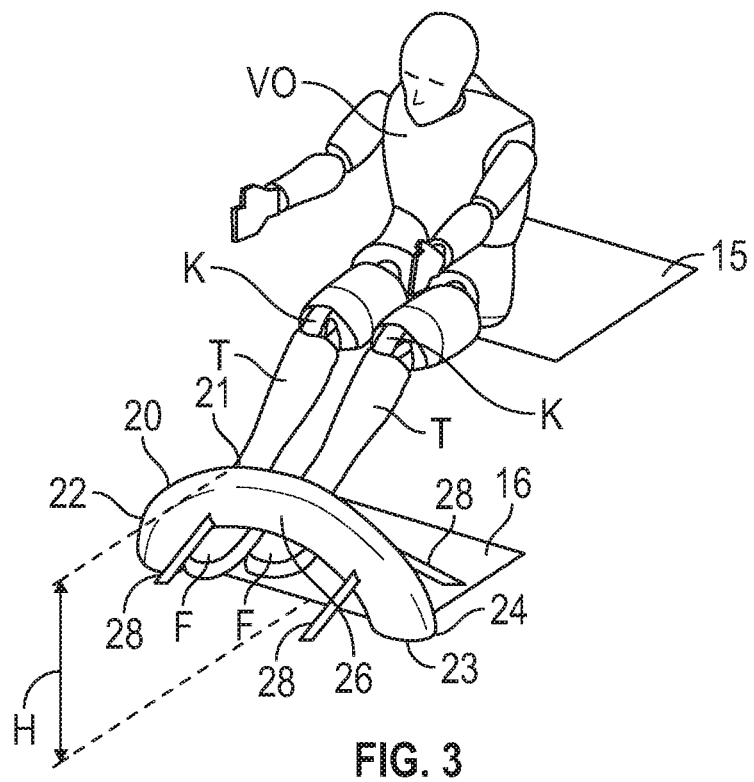
FIG. 3 is a schematic perspective view of a vehicle seat and the airbag assembly of FIG. 1, depicting the airbag in the deployed position.
Figure 4:
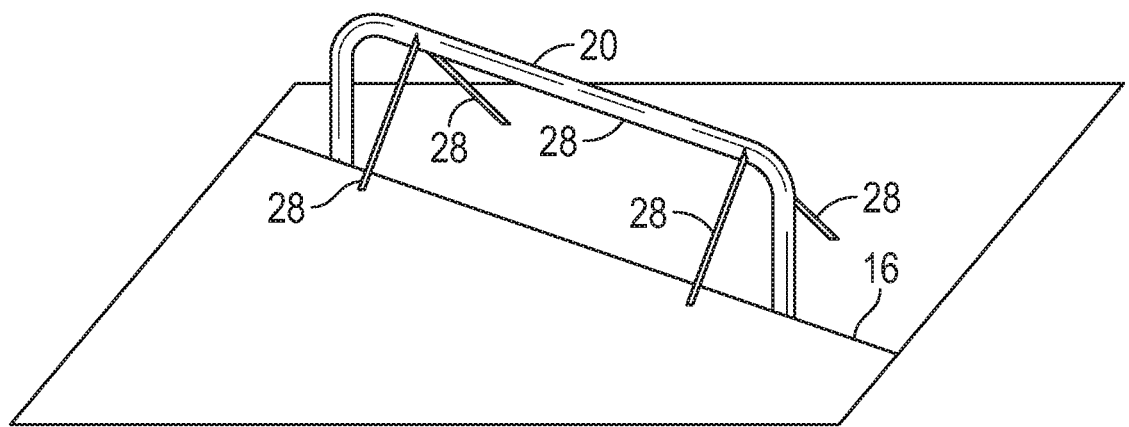
FIG. 4 is a schematic perspective view of an airbag having a rectangular shape.
Figure 5:
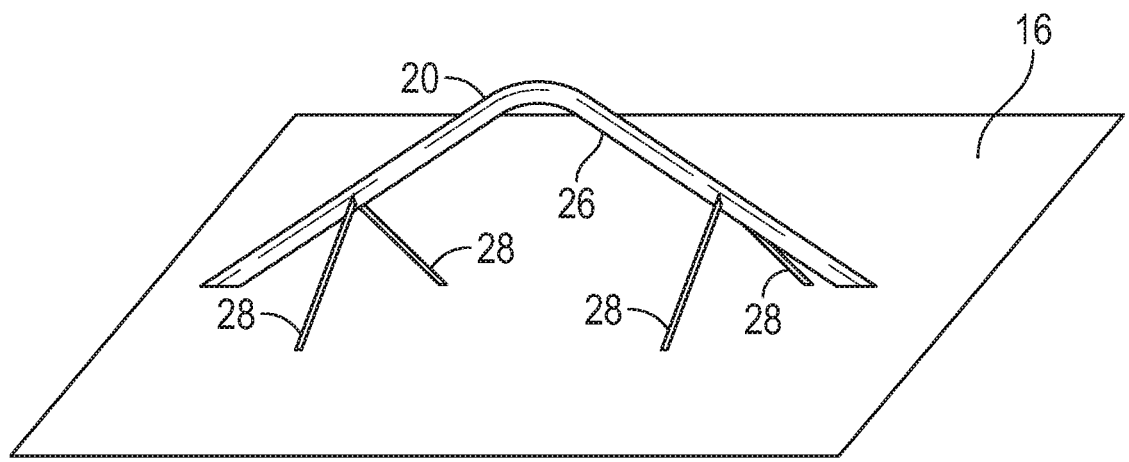
FIG. 5 is a schematic perspective view of an airbag having a triangular shape.

With reference to FIGS. 1, 2, and 3, the airbag 20 is movable (i.e., inflatable) between a stowed position (FIG. 2) and a deployed position (FIG. 3). In the depicted embodiment, the airbag 20 may extend along an entire width W of the vehicle floor 16 in the deployed position to protect the maximum number of vehicle occupants VO when the vehicle 10 is subjected to the external force EF. Alternatively, the airbag 20 may be sized for a single individual. In the stowed position, the airbag 20 is deflated. In the deployed position, the airbag 20 is inflated. The airbag 20 defines a first airbag end 22 and a second airbag end 24 opposite the first airbag end 22. The first airbag end 22 is directly coupled to the vehicle floor 16 to enhance the structural connection between the vehicle floor 16 and the airbag 20. The second airbag end 24 directly coupled to the vehicle floor 16 to enhance the structural connection between the vehicle floor 16 and the airbag 20. In the deployed position, the airbag 20 is spaced apart from the vehicle floor 16 to define an aperture 26 (FIG. 3) between the airbag 20 and the vehicle floor 16. The aperture 26 is sized to receive the feet F (and optionally the ankles A and/or the tibia T, which also referred to as the lower leg) of the vehicle occupant VO, thereby limiting movement of the legs L of the vehicle occupant when the external force EF is exerted on the vehicle 10. The first airbag end 22 is spaced apart from the second airbag end 24 to define the aperture 26 upon deployment of the airbag 20. The airbag assembly 12 includes one or more tethers 28 interconnecting the airbag 20 and the vehicle floor 16 to control the angle and the height H of the airbag 20 upon deployment. The height H of the airbag 20 is measured from the vehicle floor 16 to the uppermost portion 21 of the airbag 20 to the lowermost portion 23 of the airbag 20 in the deployed position. In the depicted embodiment, the airbag 20 has a circular tubular shape (FIG. 3) in the deployed position in order to facilitate manufacturing. However, the airbag 20 may have other suitable shapes. For example, as shown in FIG. 4, the airbag 20 may have a rectangular shape that collectively defines the aperture 26 with the vehicle floor 16 when the airbag 20 is in the deployed position. Alternatively, as shown in FIG. 5, the airbag 20 may have a triangular shape that collectively defines the aperture 26 with the vehicle floor 16 when the airbag 20 is in the deployed position.

Figure 6:
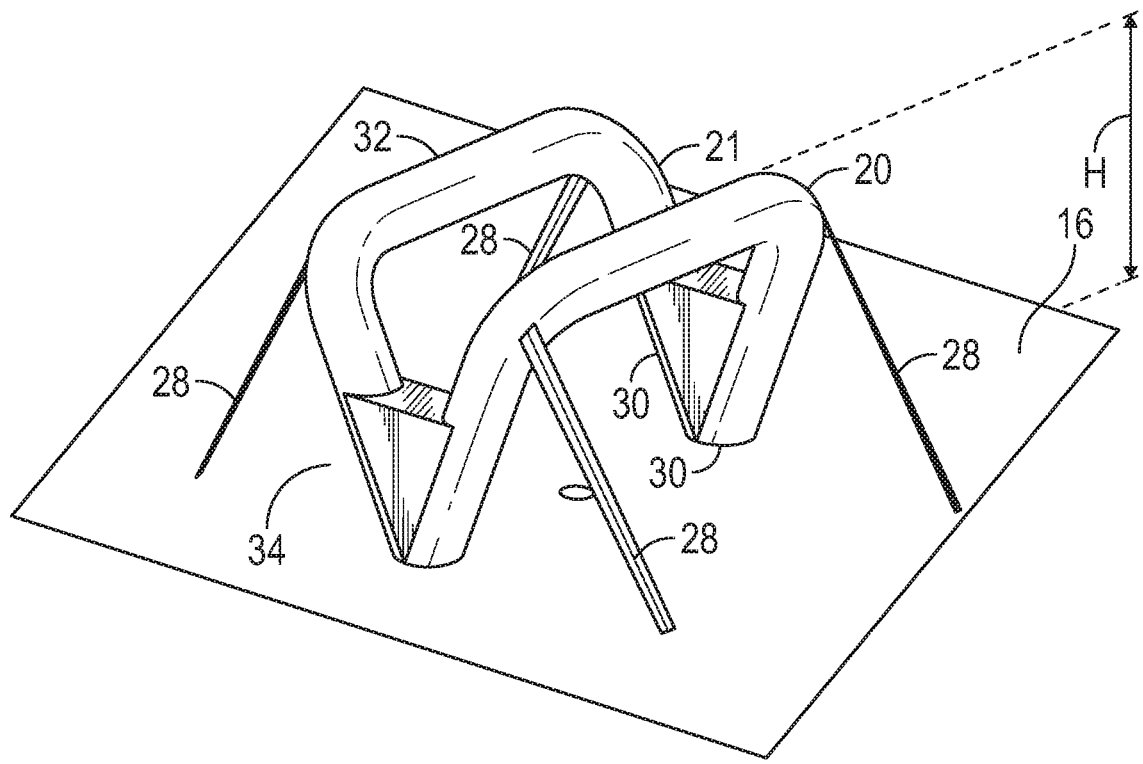
FIG. 6 is a schematic perspective view of an airbag having two tubes and a chamber adjacent the vehicle floor.
Figure 7:
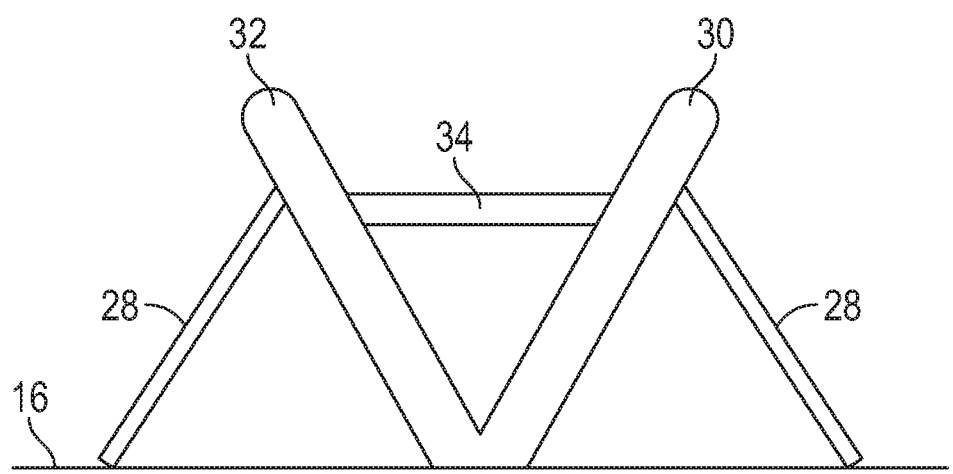
FIG. 7 is a schematic perspective view of an airbag having two tubes and a chamber that is spaced apart from the vehicle floor.

With reference to FIG. 6, the airbag 20 includes a first tube 30, a second tube 32, and a chamber 34 disposed between the first tube 30 and the second tube 32. The first tube 30 and the second tube 32 are obliquely angled relative to each other in the deployed position. The chamber 34 is adjacent the vehicle floor 16 and directly interconnects the the first tube 30 and the second tube 32. As such, upon deployment of the airbag 20, the chamber 34 inflates, causing the first tube 30 and the second tube 32 to move away from each other. As a result, the airbag 20 protects more vehicle occupants VO in the vehicle 10. One or more tethers 28 may interconnect the vehicle floor 16 and the first tube 30 and/or the second tube 32 to control the height H of the airbag 20. In the embodiment shown in FIG. 6, the chamber 34 has a triangular shape to facilitate moving the first tube 30 and the second tube 32 away from each other upon deployment of the airbag 20. However, as shown in FIG. 7, the chamber 34 may alternatively have a tubular shape.

Figure 8:
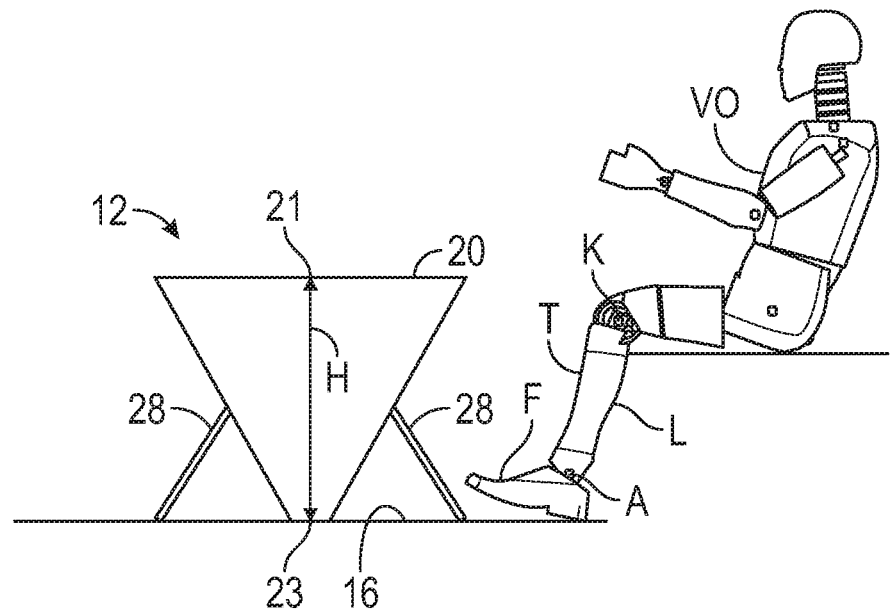
FIG. 8 is a schematic side view of an airbag having a height sufficient to limit movement of the knees of a vehicle occupant.
Figure 9:
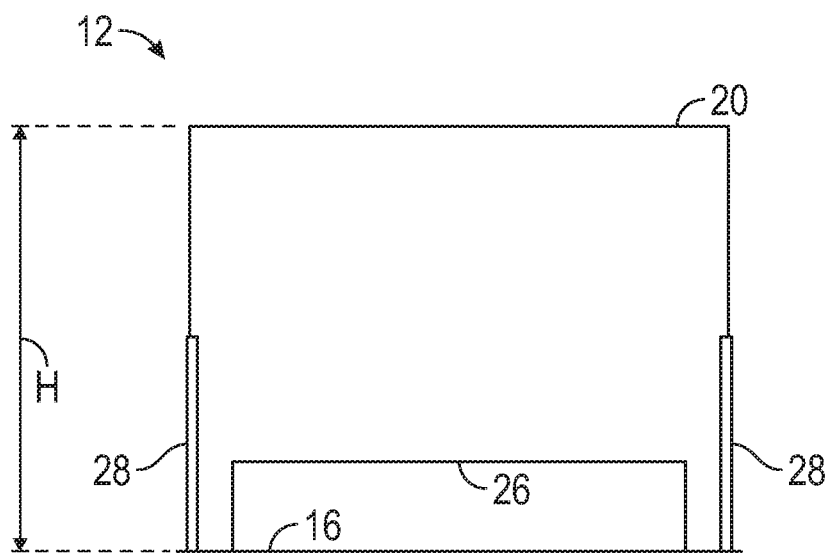
FIG. 9 is a schematic front view of the airbag of FIG. 8.

With reference to FIGS. 8 and 9, the airbag 20 is substantially shaped as a pyramidal frustum to facilitate limiting the movement of knees K of the vehicle occupant VO upon deployment of the airbag 20. Further, the height H of the airbag is sufficient to limit the movement of the knees K of the vehicle occupant VO upon deployment. As discussed above, the height H of the airbag 20 is measured from the vehicle floor 16 to the uppermost portion 21 of the airbag 20 to the lowermost portion 23 of the airbag 20 in the deployed position. The airbag assembly 12 may include one or more tethers 28 interconnecting the vehicle floor 16 and the airbag 20. In this embodiment, the tethers 28 may be directly connected to the airbag 20 at a position between the lowermost portion 23 and the uppermost portion 21 of the airbag 20 to allow the airbag 20 to reach its maximum height H upon deployment, thereby limiting motion of the knees K of the vehicle occupant VO. In the depicted embodiment, the aperture 26 defined between the vehicle floor 16 and the airbag 20 has a rectangular shape to receive the feet F of the vehicle occupant VO. However, it is envisioned that the aperture 26 may alternatively have a triangular or circular shape.

Figure 10:
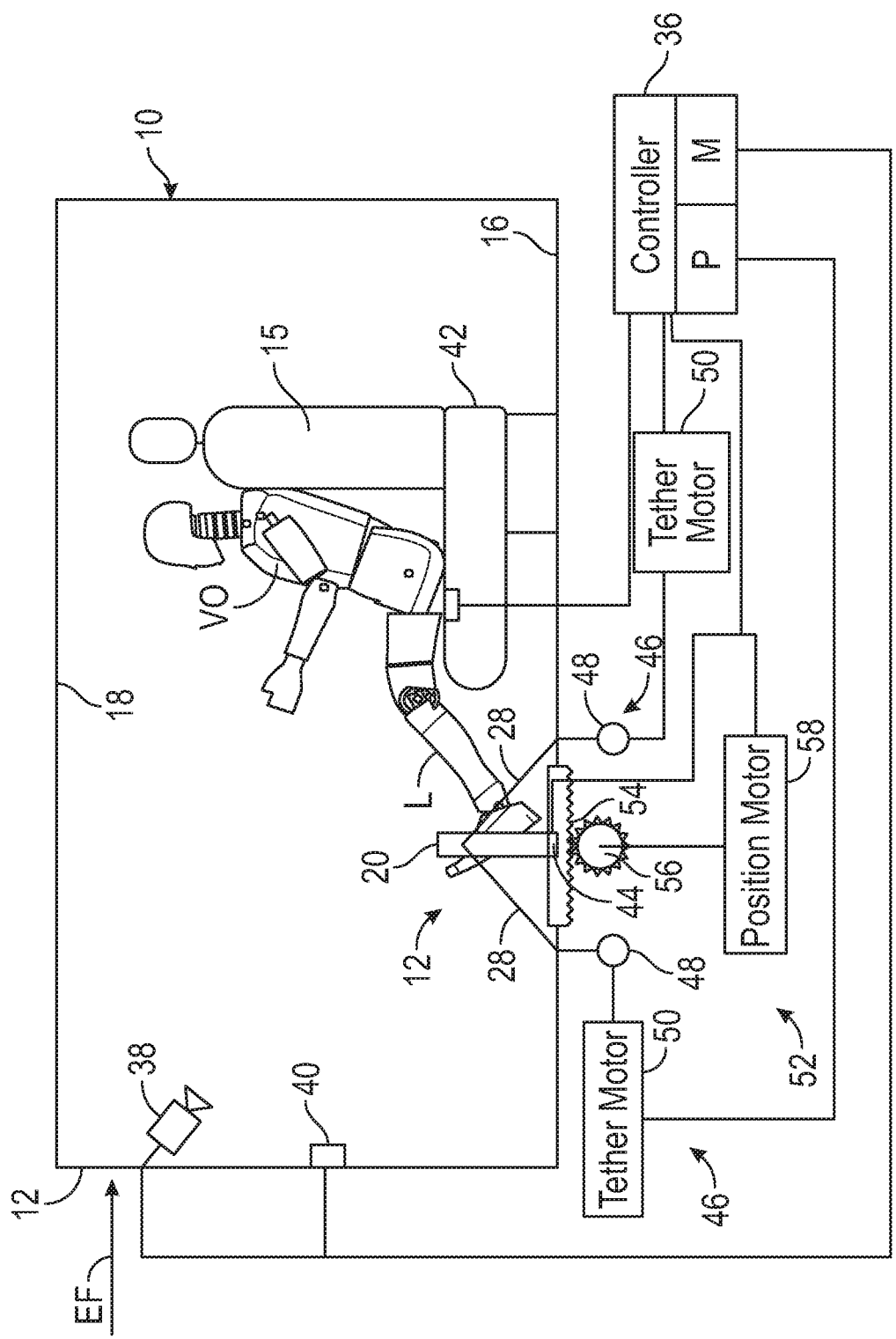
FIG. 10 is a schematic illustration of vehicle including the airbag assembly of FIG. 1.

With reference to FIG. 10, as discussed above, the vehicle body 14 and the vehicle floor 16 define the passenger compartment 18 of the vehicle 10. One or more vehicle seats 15 are disposed in the passenger compartment 18. The vehicle 10 includes a controller 36 for controlling the operation of the airbag assembly 12. The controller 36 may include hardware elements such as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. A method 100 (FIG. 11) may be recorded in memory (M) and executed by the processor (P) in the overall control of the airbag assembly 12.

With continued reference to FIG. 10, the vehicle 10 further includes a camera system 38 coupled to the vehicle body 14 and points toward the vehicle occupant VO to capture images of the vehicle occupant VO. The camera system 38 is in electronic communication with the controller 36. The camera system 38 is configured to locate the position of the legs L of the vehicle occupant VO and measure the length of the legs of the vehicle occupant VO based on the captured images of the vehicle occupant VO. The vehicle 10 further includes an accelerometer 40 (or other sensor suitable to detect when the vehicle 10 is subjected to the external force EF). The accelerometer 40 is in electronic communication with the controller 36 and is configured to detect when vehicle 10 is subjected to the external force EF. The vehicle 10 further includes a pressure sensor 42 coupled to the vehicle seat 15. The pressure sensor 42 is in electronic communication with the controller 36 and is configured to detect whether the vehicle seat 15 is occupied by the vehicle occupant VO.

With continued reference to FIG. 10, the airbag assembly 12 includes an inflator 44 coupled to the airbag 20. The inflator 44 may be a pyrotechnic actuator and is configured to inflate the airbag 20 in response to detecting that the external force F is applied to the vehicle 10. The inflator 44 is in electronic communication with the controller 36. The airbag assembly 12 includes a tether-length adjustment mechanism 46 in electronic communication with the controller 36. The tether-length adjustment mechanism 46 is configured to adjust the length of one or more tethers 28. The airbag assembly 12 may include one tether-length adjustment mechanism 46 for each tether 28. In the depicted embodiment, each tether-length adjustment mechanism 46 is coupled to one of the tether 28 and includes a reel 48 coupled to the tether 28 to wind the tether 28. The tether-length adjustment mechanism 46 further includes a tether motor 50 coupled to the reel 48 and in electronic communication with the controller 36. As such, the controller 36 is configured to activate the tether motor 50, causing the reel 48 to rotate. Depending on the rotational direction of the reel 48, activating the tether motor 50 causes the reel 48 to wind or unwind the tether 28 in order to adjust the length of the tether 28.

The airbag assembly 12 further includes an airbag-position adjustment mechanism 52 in electronic communication with the controller 36. The airbag-position adjustment mechanism 52 is configured to adjust the position of the airbag 20 relative to the vehicle floor 16. The airbag-position adjustment mechanism 52 includes a rack 54 and a pinion 56 meshed with each other. The rack 54 is coupled to the airbag 20, and the pinion is meshed with the rack 54. Rotating the pinion 56 causes the rack 54 to move linearly, thereby adjusting the position of the airbag 20 relative to the vehicle floor 16. The airbag-position adjustment mechanism 52 further includes a position motor 58 coupled to the pinion 56 and in electronic communication with the controller 36. The controller 36 is configured to activate the position motor 58, causing the pinion 56 to rotate. Rotating the pinion 56 causes the rack 54 to move linearly. Because the pinion 56 is coupled to the airbag 20, the linear motion of the pinion 56 causes the airbag 20 to move, thus adjusting the position of the airbag 20 relative to the vehicle floor 16.

Figure 11:
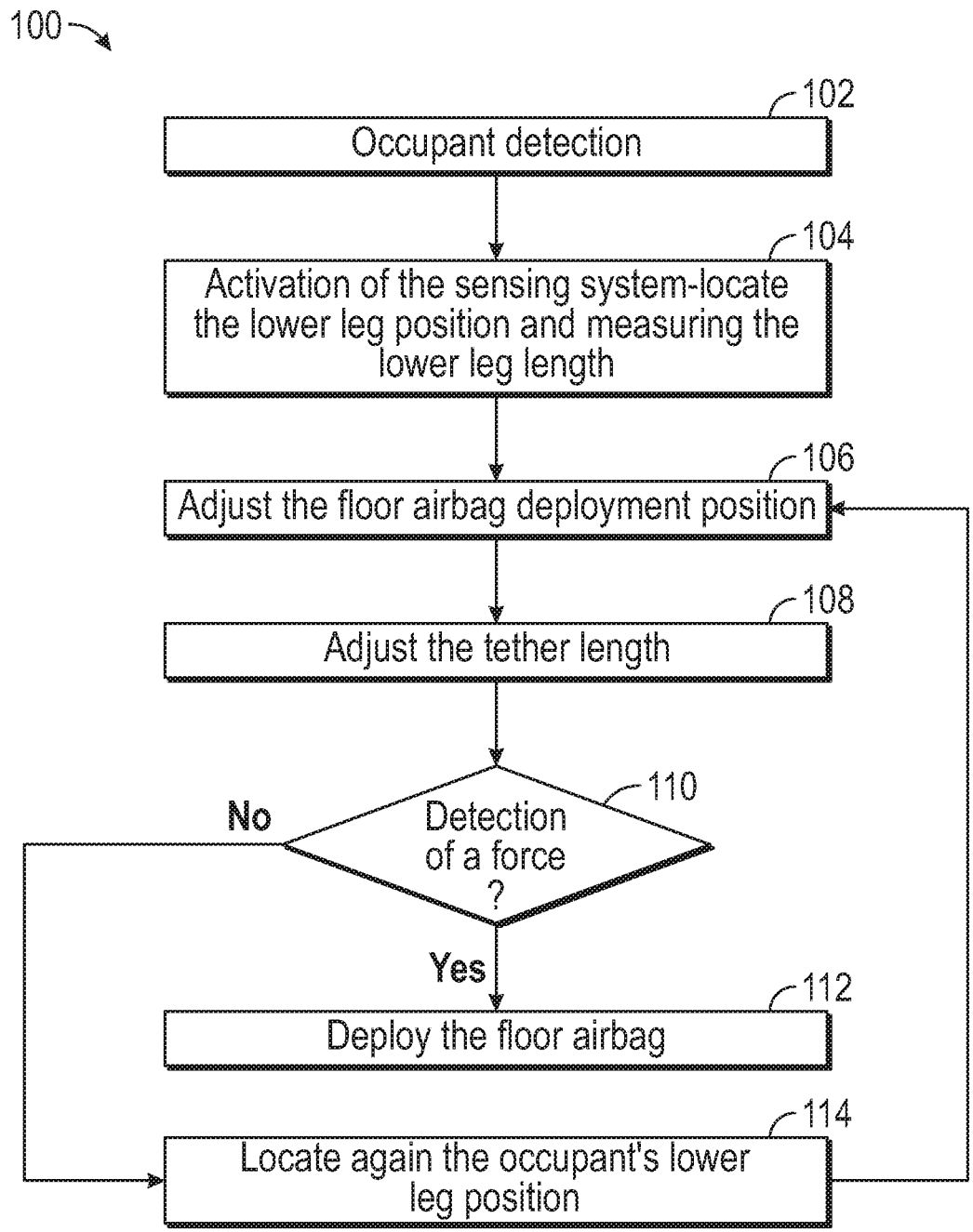
FIG. 11 is a flowchart of a method for controlling the operation of the airbag of FIG. 1.

With reference to FIG. 11, the controller 36 (FIG. 10) is programmed to execute the method 100 to control the operation of the airbag 20 (FIG. 10). The method 100 begins at block 102. At block 102, the controller 36 detects that the vehicle occupant VO is seated on the vehicle seat 15 based on a pressure signal received from the pressure sensor 42.

The method 100 then proceeds to block 104. At block 104, the controller 36 activates the camera system 38 (or other suitable sensing system) to determine the location the legs L of the vehicle occupant VO relative to the vehicle floor 16 based on the image data from the camera system 38 in response to determining that the vehicle occupant VO is seated on the vehicle seat 15. Also at block 104, the controller 36 detects the length of the legs L of the vehicle occupant VO based on the image data from the camera system 38 in response to determining that the vehicle occupant OC is seated on the vehicle seat 15. Then, the method 100 proceeds to block 106.

At block 106, the controller 36 commands the airbag-position adjustment mechanism 52 to adjust the position of the airbag 20 relative to vehicle floor 16 based on the location and length of the legs L of the vehicle occupant VO, thereby adjusting the deployment position of the airbag 20. Then, the method 100 proceeds to block 108. At block 108, the controller 36 commands the tether-length adjustment mechanism 46 to adjust the height H of the airbag 20 relative to the vehicle floor 16 based on the length of the legs L of the vehicle occupant VO. Then, the method 100 proceeds to block 110.

At block 110, the controller 36 determines whether the vehicle 10 has been subjected to the external force EF based on an acceleration signal from the accelerometer 40 (or other suitable sensor). In other words, the controller 36 is programmed to detect an external force applied to the vehicle 10. If the controller 36 determines that the the vehicle 10 has been subjected to the external force EF, then the method 100 proceeds to block 112. At block 112, the controller 36 commands the inflator 44 to inflate the airbag 20 in response to determining that the vehicle 10 has been subjected to the external force EF.

If the controller 36 determines that the the vehicle 10 has not been subjected to the external force EF, then the method 100 proceeds to block 114. At block 114, the controller determines again the location of the legs L of the vehicle occupant VO relative to the vehicle floor 16 based on the image data from the camera system 38. Then, the method 100 returns to block 106.

While the best modes for carrying out the disclosure have been described in detail, those familiar with the art to which this disclosure relates will recognize various alternative designs and embodiments for practicing the disclosure within the scope of the appended claims.

What is claimed is:

1. An airbag assembly, comprising:
    an airbag configured to be coupled to a vehicle floor of a vehicle;
    wherein the airbag is movable between a stowed position and a deployed position;
    wherein, in the stowed position, the airbag is deflated;
    wherein, in the deployed position, the airbag is inflated and spaced apart from the vehicle floor to define an aperture between the airbag and the vehicle floor; and
    wherein the aperture is sized to receive feet of a vehicle occupant, thereby limiting movement of legs of the vehicle occupant when an external force is exerted on the vehicle.

2. The airbag assembly of claim 1, wherein the airbag defines a first airbag end and a second airbag end opposite the first airbag end, the first airbag end is directly coupled to the vehicle floor, the second airbag end directly coupled to the vehicle floor, the first airbag end is spaced apart from the second airbag end to define the aperture upon deployment of the airbag.

3. The airbag assembly of claim 2, further comprising at least one tether interconnecting the airbag and the vehicle floor to control a height of the airbag upon deployment of the airbag.

4. The airbag assembly of claim 3, wherein the airbag has a circular tubular shape in the deployed position.

5. The airbag assembly of claim 3, wherein the airbag has a rectangular shape in the deployed position.

6. The airbag assembly of claim 3, wherein the airbag has a triangular shape in the deployed position.

7. The airbag assembly of claim 3, wherein the airbag extends along an entire width of the vehicle floor in the deployed position.

8. The airbag assembly of claim 3, wherein the airbag includes a first tube, a second tube, and a chamber disposed between the first tube and the second tube, and the first tube and the second tube are obliquely angled relative to each other in the deployed position.

9. The airbag assembly of claim 8, wherein the chamber is adjacent the vehicle floor and directly interconnects the first tube and the second tube such that, upon the deployment of the airbag, the first tube and the second tube move away from each other.

10. The airbag assembly of claim 8, wherein the chamber is spaced apart from the vehicle floor and directly interconnects the first tube and the second tube such that, upon the deployment of the airbag, the first tube and the second tube move away from each other.

11. The airbag assembly of claim 3, wherein the airbag is substantially shaped as a pyramidal frustum and has a height sufficient to limit movement of knees of the vehicle occupant upon deployment of the airbag.

12. The airbag assembly of claim 3, further comprising an inflator coupled to the airbag such that the inflator is configured to inflate the airbag, a controller in electronic communication with the inflator, a tether-length adjustment mechanism in electronic communication with the controller, an airbag-position adjustment mechanism in electronic communication with the controller, and a camera system in electronic communication with the controller, an accelerometer in electronic communication with the controller, and a pressure sensor coupled to a vehicle seat and in electronic communication with the controller, wherein the pressure sensor is configured to detect whether the vehicle seat is occupied by the vehicle occupant, the tether-length adjustment mechanism is configured to adjust a length of the at least one tether, and the camera system is configured locate a position of the legs of the vehicle occupant and measure a length of the legs, and the airbag-position adjustment mechanism is configured to adjust a position of the airbag relative to the vehicle floor.

13. The airbag assembly of claim 12, wherein the controller is programmed to:
    detect that the vehicle occupant is seated on the vehicle seat based on a pressure signal received from the pressure sensor;
    determine a location of the legs of the vehicle occupant relative to the vehicle floor based on an image data from the camera system in response to determining that the vehicle occupant is seated on the vehicle seat;
    determine the length of the legs of the vehicle occupant based on the image data from the camera system in response to determining that the vehicle occupant is seated on the vehicle seat;

command the airbag-position adjustment mechanism to adjust the position of the airbag relative to vehicle floor based on the location of the legs of the vehicle occupant; and command the tether-length adjustment mechanism to adjust the height of the airbag relative to the vehicle floor based on the length of the legs of the vehicle occupant.

14. The airbag assembly of claim 13, wherein the controller is programmed to:
determine whether the vehicle has been subjected to the external force based on an acceleration signal from the accelerometer; and
in response to determining that the vehicle has been subjected to the external force, command the inflator to inflate the airbag.

15. The airbag assembly of claim 14, wherein the controller is programmed to:
determine whether the vehicle has been subjected to the external force based on an acceleration signal from the accelerometer; and
in response to determining that the vehicle has not been subjected to the external force, determine again the location the legs of the vehicle occupant relative to the vehicle floor based on the image data from the camera system.

16. A method, comprising:
detecting, via a controller, that a vehicle occupant is seated on a vehicle seat based on a pressure signal received from a pressure sensor;
determining, via the controller, a location of legs of the vehicle occupant relative to a vehicle floor based on an image data from a camera system in response to determining that the vehicle occupant is seated on the vehicle seat;
determining, via the controller, a length of the legs of the vehicle occupant based on the image data from the camera system in response to determining that the vehicle occupant is seated on the vehicle seat;
commanding, via the controller, an airbag-position adjustment mechanism to adjust a position of an airbag relative to the vehicle floor based on the location of the legs of the vehicle occupant;
commanding, via the controller, a tether-length adjustment mechanism to adjust a height of the airbag relative to the vehicle floor based on the length of the legs of the vehicle occupant.

17. The method of claim 16, further comprising:
determining, via the controller, whether a vehicle has been subjected to an external force based on an acceleration signal from an accelerometer;
in response to determining that the vehicle has been subjected to the external force, commanding, via the controller, an inflator to inflate the airbag.

18. The method of claim 16, further comprising:
determining, via the controller, whether a vehicle has been subjected to an external force based on an acceleration signal from an accelerometer;
in response to determining that the vehicle has not been subjected to the external force, determining again, via the controller, the location the legs of the vehicle occupant relative to the vehicle floor based on the image data from the camera system.

19. A vehicle, comprising:
a vehicle body;
a vehicle floor coupled to the vehicle body, wherein the vehicle body and the vehicle floor collectively define a passenger compartment;
an airbag coupled to the vehicle floor, wherein the airbag defines a first airbag end and a second airbag end opposite the first airbag end, the first airbag end is directly coupled to the vehicle floor, the second airbag end is directly coupled to the vehicle floor;
wherein the airbag is movable between a stowed position and a deployed position;
wherein, in the stowed position, the airbag is deflated;
wherein, in the deployed position, the airbag is inflated and spaced apart from the vehicle floor to define an aperture between the airbag and the vehicle floor;
wherein the aperture is sized to receive feet of a vehicle occupant, thereby limiting movement of legs of the vehicle occupant when an external force is exerted on the vehicle, and the first airbag end is spaced apart from the second airbag end to define the aperture upon deployment of the airbag;
at least one tether interconnecting the airbag and the vehicle floor to control a height of the airbag upon deployment;
an inflator coupled to the airbag such that the inflator is configured to inflate the airbag;
a controller in electronic communication with the inflator;
a tether-length adjustment mechanism in electronic communication with the controller, the tether-length adjustment mechanism is configured to adjust a length of the at least one tether;
an airbag-position adjustment mechanism in electronic communication with the controller, wherein the airbag-position adjustment mechanism is configured to adjust a position of the airbag relative to the vehicle floor;
a camera system in electronic communication with the controller, wherein the camera system is configured locate a position of the legs of the vehicle occupant and measure a length of the legs of the vehicle occupant;
an accelerometer in electronic communication with the controller;
a pressure sensor coupled to a vehicle seat and in electronic communication with the controller, wherein the pressure sensor is configured to detect whether the vehicle seat is occupied by the vehicle occupant;
wherein the controller is programmed to:
detect that the vehicle occupant is seated on the vehicle seat based a pressure signal received from the pressure sensor;
determine a location the legs of the vehicle occupant relative to the vehicle floor based on an image data from the camera system in response to determining that the vehicle occupant is seated on the vehicle seat;
determine the length of the legs of the vehicle occupant based on the image data from the camera system in response to determining that the vehicle occupant is seated on the vehicle seat;
command the airbag-position adjustment mechanism to adjust the position of the airbag relative to the vehicle floor based on the location of the legs of the vehicle occupant; and
command the tether-length adjustment mechanism to adjust the height of the airbag relative to the vehicle floor based on the length of the legs of the vehicle occupant.

20. The vehicle of claim 19, wherein the airbag has a circular tubular shape in the deployed position, the airbag extends along an entire width of the vehicle floor in the deployed position, and the controller is programmed to:
determine whether the vehicle has been subjected to the external force based on an acceleration signal from the accelerometer; and
in response to determining that the vehicle has been subjected to the external force, command the inflator to inflate the airbag.

\* \* \* \* \*